Patented Aug. 16, 1932

1,872,463

UNITED STATES PATENT OFFICE

IRVIN H. JONES, OF PITTSBURGH, PENNSYLVANIA, ASSIGNOR TO THE KOPPERS COMPANY OF DELAWARE, A CORPORATION OF DELAWARE

PROCESS OF TREATING HYDROCARBONS

No Drawing.    Application filed October 1, 1927.  Serial No. 223,479.

This invention relates to the treatment of hydrocarbon oils, such as the aromatic light oils which are recovered from coal gas, for use as motor fuel or as raw material for the manufacture of pure benzol, toluol and xylol.

In working up and purifying the crude light oil recovered from coal gas, as also in the refining of petroleum distillates, it has been common to wash the oil with sulphuric acid to effect a polymerization of unsaturates and removal of other impurities. These materials separate as a viscous tarry substance known as "acid sludge", consisting probably of a mixture of polymerized hydrocarbons, sulphurated hydrocarbons, oxidized hydrocarbons and free acid. The acid sludge is sometimes treated for the recovery of free acid therefrom, but remains a serious problem for the gas or oil manufacturer. As produced in practice, the hydrocarbon content of the sludge is completely insoluble in water and is very difficult to dispose of.

An object of the present invention is to provide a process of treating hydrocarbons which shall result in a sludge capable of being brought into solution or fine dispersion in water, that may be readily disposed of.

A further object of my invention is to provide a process of so dissolving or effecting a dispersion of a sludge produced thereby.

My invention has for further objects such other inherent advantages or results as may hereinafter be found to obtain.

A process used to some extent in Germany attempts to dispose of acid sludge by treating it with ammonia liquor, thereby neutralizing the free acid and liberating ammonium sulphate, but the remaining hydrocarbons settle out as a thin tar.

However, when this process is applied to acid sludge produced in the United States, the hydrocarbons are precipitated in a flocculent form that is insoluble in the more common solvents. This is an undersirable condition.

It is further noted that acid sludge produced in the United States tends to settle into two phases, a liquid phase and a solid phase. The condition of the sludge seems to be due in part at least to the amount of acid used. The usual plant practice is to wash the oil first with 0.6% by volume of acid, which is drawn off and followed by a wash with 1.9% by volume of fresh acid. The total amount of acid employed is thus 2.5% by volume of the light oil being treated.

I have found that, when the light oil produced at the same plant is washed with from about four to seven percent of acid or more, i. e., an excess of more than about 60 percent of the usual amount, the properties of the resultant acid sludge produced differ very materially from those of the plant sludge previously produced. Using such an excess of acid, the resultant acid sludge is fluid in character and does not tend to separate into two phases upon standing.

I have also found that neutralization of this sludge results in a material which is completely soluble or dispersible in neutral or alkaline solution. For example, acid sludge produced by washing light oil with an excess of acid, when tested with sufficient ammonia to neutralize it, went completely into solution or dispersion so fine as to pass a standard filter paper.

As such a dispersion possesses practically all the properties of a true solution, and may be acurately designated as a colloidal solution, the term "solution" is hereinafter used to designate this result, irrespective of whether a true solution or a colloidal solution is obtained.

However, no alkali need be employed to effect the solution of the acid sludge, as I have found that this result may be effected with water alone. This is accomplished by extracting the free acid from the sludge with water. This may be thought of as a species of neutralization, although no actual neutralization of the free sulphuric acid occurs, and the remaining hydrocarbons may include substances slightly acid in character. However, the substantially complete absence of the free and strong sulphuric acid is what is desired. The following specific example is given as an illustration of this process.

Crude light oil was treated with 5% by volume of concentrated sulphuric acid, i. e. acid of about 66° Bé., the acid being added slowly during agitation of the mixture, while the temperature was kept down to about 21° C. After sufficient agitation, the mixture was allowed to settle and the acid sludge, amount to 12% by volume of the light oil, was drawn off.

To this sludge was added a large excess (five parts to one) of water. The mixture was raised to from 80° to 85° C., which is sufficient, although it may be carried higher, and even boiled, if desired, and was kept at this elevated temperature until the insoluble sludge had agglutinated.

The mixture was allowed to cool and was decanted to separate the hydrocarbon mass therefrom. This mass was given a quick water wash to remove any remaining free acid, and was then mixed with a large excess (15 parts to one) of water. Upon heating, the hydrocarbons were rapidly dissolved. The resultant solution is dark in color and passes a standard filter paper without change.

While I have hereinabove described a preferred procedure as an example of the process of my invention, it is not intended that my invention be limited to such specific quantities or mode of procedure.

For example, the water wash following the first treatment with hot water may be omitted when not necessary or desired, as solution may be effected without this wash. Moreover, the amount of water used will depend somewhat upon the nature of the sludge, and that in turn, upon the nature of the light oil treated, and can best be judged by the operator.

While it has been suggested that the neutral and soluble sludge is changed in chemical form and is a new hydrocarbon, I am inclined toward the theory that the solution or dispersion is a physical phenomenon of particle size and the like, but I do not wish to limit this process and invention to a particular theory, as a full knowledge of the exact phenomena involved is not essential to the performance or success of the process.

In treating the light oil, the acid wash of my process may be followed with the usual water and alkali washes and distillation of the prior art.

According to my invention, I provide a process of treating hydrocarbons to remove impurities therefrom which accomplishes the desired results and at the same time results in a new form of sludge that is soluble in water when properly treated. Such sludge is readily disposed of by reason of the fact that the solution of the sludge in water may be drained into sewers without fear of resultant stoppage or other nuisance.

My invention is not limited to the specific example or examples given hereinabove by way of illustration, but is to be construed as of the scope of the following claims.

I claim as my invention:

1. In the treatment of aromatic hydrocarbon oil such as that recovered from coal gas, the steps which comprise, first treating the oil with a sufficient excess of sulphuric acid to cause the resultant sludge to be liquid rather than solid in character, removing the acid and sludge from the oil, adding thereto a large excess of water and heating the resultant mixture until the insoluble material agglutinates, removing acid from the insoluble material and agitating the substantially acid-free insoluble material with a large volume of water, whereby said material is caused to go into solution or dispersion in said water.

2. In the treatment of aromatic hydrocarbon oil such as that recovered from coal gas, the steps which comprise, first treating the oil with a sufficient excess of sulphuric acid to cause the resultant sludge to be liquid rather than solid in character, removing the acid and sludge from the oil, adding thereto a large excess of water and heating the resultant mixture to a temperature of at least 80° C. until the insoluble material agglutinates, removing acid from the insoluble material and agitating the substantially acid-free insoluble material with a large volume of water at an elevated temperature, whereby said material is caused to go into solution or dispersion in said water.

3. In the treatment of aromatic hydrocarbon oil such as that recovered from coal gas, the steps which comprise, first treating the oil with from 4 to 7% of concentrated sulphuric acid, removing the acid and liquid sludge thereby produced from the oil, adding thereto a quantity of water equal to at least five times the volume thereof, heating the mixture until the insoluble material agglutinates, removing the agglutinated insoluble material and treating it with a relatively large volume of water at a temperature of at least 80° C. whereby said material is caused to go into solution or dispersion in said water.

In testimony whereof, I have hereunto subscribed my name this 30th day of September, 1927.

IRVIN H. JONES.